United States Patent
Ho

(10) Patent No.: US 7,866,564 B2
(45) Date of Patent: Jan. 11, 2011

(54) DUAL CARD SYSTEM

(76) Inventor: Chun-Hsin Ho, 7F-1, No. 180, Sec. 2, Duen Hua South Rd., Taipei 106 (TW)

( * ) Notice: Subject to any disclaimer, the term of this patent is extended or adjusted under 35 U.S.C. 154(b) by 432 days.

(21) Appl. No.: 11/798,963

(22) Filed: May 18, 2007

(65) Prior Publication Data

US 2008/0029609 A1 Feb. 7, 2008

Related U.S. Application Data

(63) Continuation-in-part of application No. 11/294,575, filed on Dec. 6, 2005, now Pat. No. 7,303,137, which is a continuation-in-part of application No. 11/051,857, filed on Feb. 4, 2005, now Pat. No. 7,198,199.

(51) Int. Cl.
*G06K 19/06* (2006.01)
(52) U.S. Cl. .................. 235/492; 235/435; 235/441; 235/487; 455/410; 709/229; 713/189
(58) Field of Classification Search .................. 235/380, 235/435, 441, 487, 492; 713/189; 729/229; 439/630
See application file for complete search history.

(56) References Cited

U.S. PATENT DOCUMENTS

| | | | |
|---|---|---|---|
| 4,562,535 A | 12/1985 | Vincent et al. | |
| 5,296,692 A | 3/1994 | Shino | |
| 5,434,395 A | 7/1995 | Storck et al. | |
| 5,736,781 A | 4/1998 | Atsumi | |
| 5,763,862 A * | 6/1998 | Jachimowicz et al. | 235/380 |
| 5,894,411 A | 4/1999 | Embo et al. | |
| 5,979,773 A * | 11/1999 | Findley et al. | 235/492 |
| 6,029,892 A | 2/2000 | Miyake | |
| 6,173,900 B1 | 1/2001 | Yoshigi et al. | |
| 6,341,069 B1 | 1/2002 | Torlotin | |
| 6,457,647 B1 * | 10/2002 | Kurihashi et al. | 235/486 |
| 6,532,158 B1 | 3/2003 | Buttett | |
| 6,581,830 B1 | 6/2003 | Jelinek et al. | |
| 6,607,127 B2 | 8/2003 | Wong | |
| 6,713,854 B1 | 3/2004 | Kledzik et al. | |
| 6,786,417 B1 | 9/2004 | Kondo et al. | |
| 6,811,082 B2 | 11/2004 | Wong | |
| 7,206,847 B1 * | 4/2007 | Alberth et al. | 709/229 |

(Continued)

FOREIGN PATENT DOCUMENTS

EP 0840247 5/1998

(Continued)

OTHER PUBLICATIONS

Kaasinen, et al., "Two approaches to bringing Internet service to WAP devices", Computer Networks, vol. 33, p. 231-246, May 23, 2000.*

*Primary Examiner*—Thien M. Le
*Assistant Examiner*—William M Anderson, Jr.
(74) *Attorney, Agent, or Firm*—Bacon & Thomas, PLLC

(57) ABSTRACT

A dual card system for use in a communication terminal is disclosed. The dual card system includes a slave card and a master card. The master card is provided with a network security function and is connected between the communication terminal and the slave card, and has a processor for controlling the slave card.

30 Claims, 3 Drawing Sheets

U.S. PATENT DOCUMENTS

| | | |
|---|---|---|
| 7,383,982 B2 * | 6/2008 | Yamamoto et al. .......... 235/375 |
| 2002/0056044 A1 * | 5/2002 | Andersson ................... 713/189 |
| 2002/0168900 A1 * | 11/2002 | Chen .......................... 439/630 |
| 2003/0006878 A1 | 1/2003 | Chung |
| 2003/0052176 A1 | 3/2003 | Nozawa et al. |
| 2003/0085285 A1 * | 5/2003 | Luu ........................... 235/486 |
| 2004/0015738 A1 | 1/2004 | Chang |
| 2004/0054628 A1 | 3/2004 | de Jong et al. |
| 2004/0087213 A1 | 5/2004 | Kao |
| 2004/0089717 A1 | 5/2004 | Harari et al. |
| 2004/0129450 A1 | 7/2004 | Yamazaki et al. |
| 2004/0129785 A1 * | 7/2004 | Luu ........................... 235/486 |
| 2004/0139207 A1 | 7/2004 | de Jong |
| 2005/0212657 A1 | 9/2005 | Simon |
| 2005/0231921 A1 | 10/2005 | Noda et al. |
| 2006/0047961 A1 | 3/2006 | Hashimoto et al. |

FOREIGN PATENT DOCUMENTS

| | | |
|---|---|---|
| EP | 0845837 | 6/1998 |
| EP | 1079324 | 8/1999 |
| EP | 1 418 527 A1 | 5/2004 |

* cited by examiner

DUAL CARD SYSTEM

CROSS-REFERENCE

The application is a continuation-in-part (CIP) application of a co-pending U.S. application Ser. No. 11/294,575, entitled "Dual Integrated Circuit Card System", filed on Dec. 6, 2005, which is a continuation-in-part (CIP) application of U.S. application Ser. No. 11/051,857, filed on Feb. 4, 2005, now U.S. Pat. No. 7,198,199, which are incorporated herein by reference in their entirety.

FIELD OF THE INVENTION

The present invention relates to a dual card system for use in a communication terminal or for use with a transaction terminal, and more particularly, a dual card system for use in a communication terminal having two card sockets.

BACKGROUND OF THE INVENTION

Generally speaking, a smart card is extensively applied to two fields. One is Subscriber Identity Module (SIM) in wireless communication, and the other is identification system, such as the financial card, ATM card or health insurance card, etc. A SIM card is used in a mobile communication device. A person who uses the wireless network system, such as GSM or CDMA system, has a SIM card issued by the related communication service company. The SIM card stores the user information, including the user's phone number, phone book, call restriction, personal identity number (PIN), personal unblock key (PUK), etc. Further, an authentic SIM card is adopted by GSM communication system for communication, so that the user can be allowed to enter into the GSM communication network for transmitting information.

Generally, the SIM card is the so-called plug-in sized card, and the size is approximately 25 mm in length and 15 mm in width. Only the copper parts are actually used for connection. When the SIM card is connected to a cellular phone, both of them have at least five contacts. The SIM card is composed of five parts including CPU, RAM, ROM, EEPROM or Flash and serial communication unit. The information stored in the SIM card includes (1) control channel information in a GSM system; (2) International Mobile Subscriber Identity (IMSI) and Temporary Mobile Subscriber Identity (TMSI); (3) user key and secret algorithm; (4) Personal Identification Number (PIN) and Personal Unlocking Key (PUK); and (5) SIM Tool Kit (STK).

With the wide-spread usage of smart cards in mobile industry such as SIM for GSM, USIM for WCDMA, RUIM for CDMA2000 and PIM for PHS network, a large variety of applications have been developed by utilizing smart cards resided in the mobile phone (SIM/USIM/RUIM/PIM, hereafter referred as UICC, Universal Integrated Circuit Card) to provide security services. Mobile operators ensure the security of the use of mobile service by authenticating the keys stored in the smart cards that mobile operators issued to the subscribers. In addition, mobile operators also provide premium services like mobile banking and mobile stock trading service by storing keys provided by the banks or other service providers in the SIM cards. The keys are manipulated through an application interface developed by SIM Tool Kit (STK) which is also resided in the SIM card itself. When WAP (Wireless Application Protocol) phones were available, WIM (Wireless Identity Module) was also developed by the SIM card vendors to secure WAP security by storing certificate and PKI algorithm in the SIM itself (SWIM card) or another standalone WIM card which can be inserted into another card slot in the mobile phone.

The keypad and display screen of the mobile phone facilitate the inserted smart card with great user interface, and the mobile nature of remote access to service providers further accomplishes the goal of service mobility. In order to achieve the service mobility, service providers like banks, credit card issuers, transportation card issuers, certificate issuers and stock brokers are eager to cooperate with the mobile operator to issue enhanced SIM cards so as to provide services which fall into their professions. However, the provisioning and management of the SIM capability and functionalities are under control of the mobile operators, and therefore it forms a closed system where only agreed parties are allowed to participate. Furthermore, the relationship between service providers and mobile operators are of mutual distrust and both have similar agendas over control of security and payment. This becomes the main obstacle to the development of mobile security services. Therefore, the present invention intends to resolve the above obstacles.

On the other hand, the traditional smart card is an ISO sized card, with 84 mm in length and 54 mm in width, and generally is applied in financial transaction system such as financial card, credit card, ATM card, or identification system such as health insurance card. Some smart cards include antennas surrounded within plastic cards to provide contactless application, called the contactless card, and are usually applied to the entrance control or the transaction payment system, such as Electronic Toll Collection (ETC) and metro fee collection. The forward communication equipment, such as Automatic Vehicle Identification (AVI), Automatic Vehicle Classification (AVC), Video Enforcement System (VES), etc. adopted by the Electronic Toll Collection (ETC) detects and scans the On Board Unit (OBU) disposed in car, and vice versa, so that the users are automatically charged by the backward accounting service system without stopping and retarding when they pass through the toll station.

SUMMARY OF THE INVENTION

In accordance with an aspect of the present invention, a dual card system for use in a communication terminal includes a slave card; and a master card provided with a network security function, connected between the communication terminal and the slave card, having a processor for controlling the slave card.

Preferably, the network security function includes network access control, mail encryption, or electronic signature.

Preferably, the slave card includes an extensible memory for increasing storage capacity.

Preferably, the slave card includes a security function.

Preferably, the security function includes a network security function, data security function, or data encryption.

Preferably, the communication terminal includes two card sockets.

Preferably, the slave card and the master card can be inserted into the two card sockets, respectively.

Optionally, the communication terminal is a mobile phone or a personal digital assistant (PDA).

Optionally, either of the slave card and master card includes a Subscriber Identity Module (SIM) card, universal SIM (USIM) card, User Identity Module (UIM) card, or Removable User Identity Module (RUIM) card.

Suitably, either of the slave card and the master card includes a WAP identity module (WIM).

Suitably, either of the slave card and master card includes a credit card, ATM card, easy card, debit card, or stored value card.

Suitably, either of the slave card and master card includes an identification card, a memory card, a health insurance card, or a membership card.

Optionally, the dual card system further includes an antenna detachably coupled to the slave card.

Advantageously, the antenna includes a laminated induction coil antenna or a planar antenna.

Optionally, the dual card system further includes an antenna detachably coupled to the master card.

Alternatively, the system can be applied to an automatic teller machine (ATM) or a point of sales (POS) card reader.

In accordance with another aspect of the present invention, a communication terminal having a dual card system includes a slave card; and a master card provided with a network security function, connected between the communication terminal and the slave card, having a processor for controlling the slave card.

Preferably, the network security function includes network access control, mail encryption, or electronic signature.

Preferably, the slave card includes an extensible memory for increasing storage capacity.

Preferably, the slave card includes a security function.

Preferably, the security function includes a network security function, data security function, or data encryption.

Preferably, the communication terminal includes two card sockets.

Preferably, the slave card and the master card can be inserted into the two card sockets, respectively.

Optionally, the communication terminal is a mobile phone or a personal digital assistant (PDA).

Optionally, either of the slave card and master card includes a Subscriber Identity Module (SIM) card, universal SIM (USIM) card, User Identity Module (UIM) card, or Removable User Identity Module (RUIM) card.

Suitably, either of the slave card and the master card includes a WAP identity module (WIM).

Suitably, either of the slave card and master card includes a credit card, ATM card, easy card, debit card, or stored value card.

Suitably, either of the slave card and master card includes an identification card, a memory card, a health insurance card, or a membership card.

Conveniently, the dual card system further includes an antenna detachably coupled to the slave card.

Advantageously, the antenna includes a laminated induction coil antenna or a planar antenna.

Optionally, the dual card system further includes an antenna detachably coupled to the master card.

Alternatively, the system can be applied to an automatic teller machine (ATM) or a point of sales (POS) card reader.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENT

The present invention discloses a dual card system for use in a communication terminal such as a mobile phone or personal digital assistant (PDA) or for use with a transaction terminal, i.e., an automated teller machine (ATM) or point of sales (POS) card reader. The following description is to explain the above-mentioned applications.

In this embodiment, the communication terminal has two card sockets for carrying two different cards at a time. The characteristic of the present invention is that the two cards are not both independently controlled by the communication terminal as those widely used in the art. Instead, one card (hereinafter called a "slave card") is controlled by the other card (hereinafter called a "master card"). In this way, telecommunication service providers that produce integrated circuit cards such as Subscriber Identity Module (SIM) cards, Universal Subscriber Identity Module (USIM) cards, User Identity Module (UIM) cards, Removable User Identity Module (RUIM) cards, etc. may predominate the additional functions and services that are to be provided, such as an additional subscription and a post-issued SIM tool kit (STK) application, i.e., mobile bank, mobile stock trading, etc.

Figure 1:
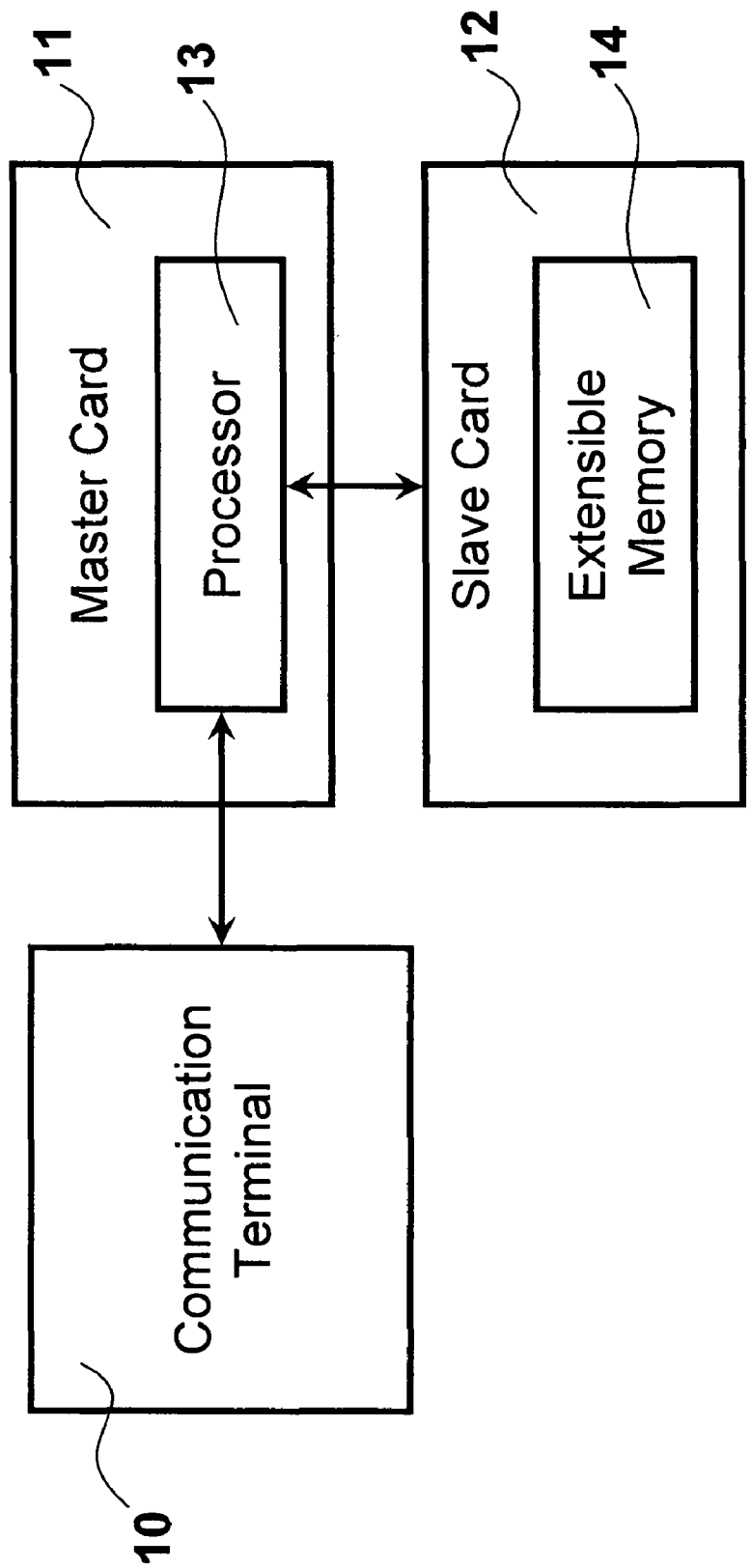
FIG. 1 is a block diagram of a dual card system according to the present invention.

Please refer to FIG. 1. FIG. 1 is a block diagram of a dual card system according to the present invention. A communication terminal 10 includes a slave card 12 and a master card 11. The master card 11 is electrically connected between the communication terminal 10 and the slave card 12, and has a processor 13 for controlling the slave card 12.

Either the master card 11 or the slave card 12 can be a communication card such as a Subscriber Identity Module (SIM) card, a Universal Subscriber Identity Module (USIM) card, User Identity Module (UIM) card, Removable User Identity Module (RUIM) card, etc. Furthermore, the slave card 12 can also be a transaction card such as a credit card, ATM card, debt-credit card, or stored value card while the master card 11 is a communication card. On the contrary, the master card 11 may also be a transaction card while the slave card 12 is a communication card. Meanwhile, either of the slave card 12 and the master card 11 may include a WAP (Wireless Application Protocol) identity module (WIM) for providing security services for WAP applications.

Besides, either the master card 11 or the slave card 12 can also be an identification card, a memory card, a health insurance card, or a membership card. The slave card 12 has an extensible memory 14 for increasing storage capacity.

Furthermore, the master card 11 is provided with a network security function, such as network access control based on electronic certification and private keys stored in the IC card memory, mail encryption and electronic signature. The slave card 12 is provided with a security function which is not limited to be a network security function as mentioned above, and can be a data security function, such as data encryption to protect the data stored in the extensible memory 14 of the slave card 12.

Either the master card 11 or the slave card 12 may have an antenna coupled to it for performing over-the-air transactions between the communication terminal and the transaction terminal, i.e., an automated teller machine (ATM) or a point of sales (POS) card reader. The antenna can be a laminated induction coil antenna or a planar antenna. In the present invention, the antenna is not necessarily to be fixedly connected to the master card 11 or the slave card 12. It can also be detachably connected.

As mentioned above, the slave card 12 and the master card 11 are not both independently controlled by the communication terminal 10 as those widely used in the art. Instead, the slave card 12 is controlled by the master card 11. Therefore, the processor 13 of the master card 11 will determine to either activate or inactivate the slave card 12 once a request from the communication terminal 10 is received. In other words, the master card can control the communication between the communication terminal 10 and the slave card 12, and reform responding signals from the slave card 12 to the communication terminal 10 to perform the add-on applications, such as the registration and switching of a second wireless communication number, the post-issued Subscriber Identity Module (SIM) Tool Kit applications (e.g., mobile bank, mobile stock or perform security functions of a WAP Identity Module (WIM)), etc. The SIM Tool Kit applications of the slave card 12, which is usually issued by the mobile operator, can be integrated with the master card 11 by its own service provider, such as a bank, stock broker, PKI Certificate Authority (CA) or second wireless mobile operator.

Figure 2:
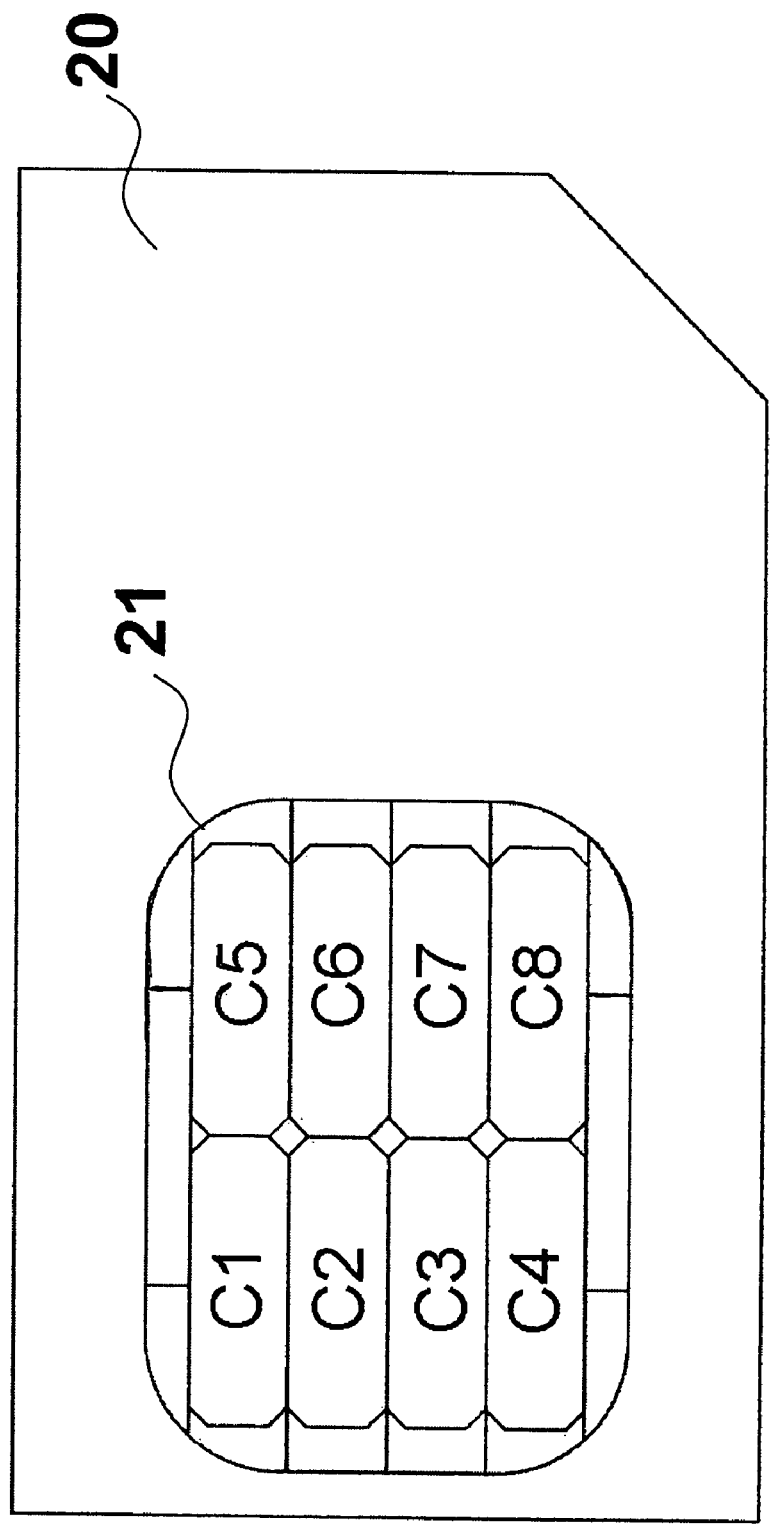
FIG. 2 shows a schematic view of an integrated circuit card according to the present invention.

Please refer to FIG. 2. FIG. 2 shows a schematic view of an integrated circuit card (ICC) 20 according to the present invention. The standardization of integrated circuit cards for use in communication terminals is an ongoing process. One of the standards most referred to is the ISO-7816 standard. ISO represents International Standards Organization and the standard has been established to describe "Identification Cards—Integrated Circuit Cards with Contacts". ISO 7816 part 2 defines the dimensions and location of the contacts which includes standards about number, function and position of the electrical contacts, as shown in Table 1. ICC 20 has an integrated circuit chip 21 having 8 electrical contacts. They are referred to as C1 through C8. However, not all 8 contacts are electrically connected to the embedded microprocessor chip and therefore unused at the present time.

Figure 3:
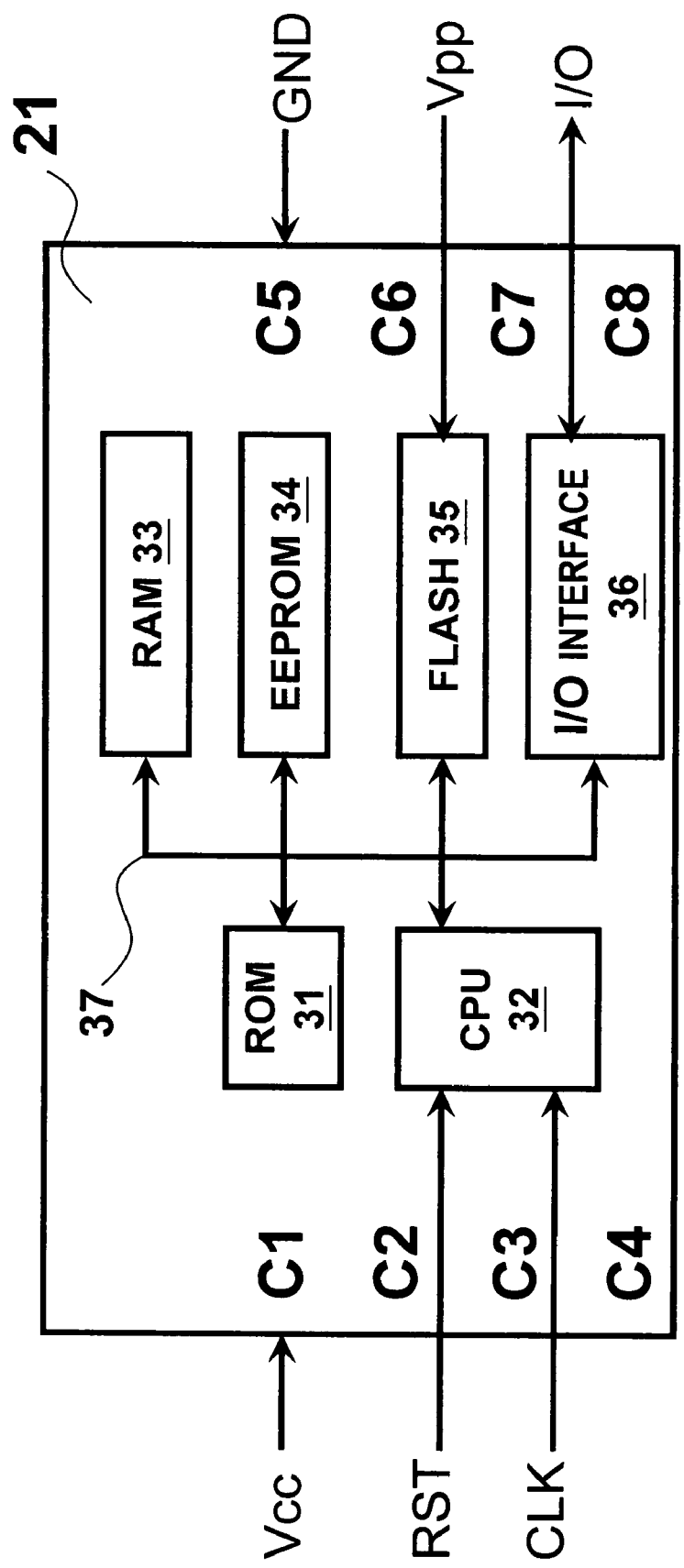
FIG. 3 is a block diagram of an integrated circuit chip of the integrated circuit card according to the present invention.

(I/O) interface 36, all interconnected via a data bus 37. The integrated circuit chip 21 interfaces to a mobile station (not shown) via an eight-contact layout C1-C8. Specifically, contact C1 is connected to a supply voltage (Vcc), contact C2 receives a reset signal (RST), contact C3 receives a clock signal (CLK), contact C5 is connected to ground (GND), contact C6 is connected to a programming voltage (Vpp) and contact C7 is connected to an I/O interface of the mobile station. As shown in FIG. 3, contacts C4 and C8 on the integrated circuit chip 21 are unused.

The CPU 32 is the heart of the SIM card 20, performs the actual data processing operations, and basically controls operation of the SIM card 20. The ROM 31 contains the operating system of the SIM card 20, which is burned into the ROM 31 so that it cannot be changed during the life of the SIM card 20. The RAM 33 is a working volatile memory of the CPU 31. All data stored in the RAM 33 are lost when power to the SIM card 20 is switched off. The EEPROM 34 is a non-volatile memory. Data can be written to and read from the EEPROM 34 under the control of the CPU 32. Data stored in the EEPROM 34 survive power cycles, and thus are not lost when power to the SIM card 20 is switched off. Various elementary files associated with the SIM card 20, such as Abbreviated Dialing Number (ADN) and Extension (EXT) records are stored in the EEPROM 34. The Flash memory 35 is a non-volatile program memory. Program code can be written to and read from the Flash memory 35 under the control of the CPU 32. Similar to the EEPROM 34, the program code stored in the Flash memory 35 survives power cycles and is not erased when power to the SIM card 20 is switched off. However, one difference between the Flash memory 35 and the EEPROM 34 is that program code in the Flash memory 35 is erased all at once, while data stored in the EEPROM 34 can be erased only one byte at a time. The I/O interface 36 may be a conventional ISO 7816 serial input/output interface used for communication between the mobile station (not shown) and the CPU 32.

TABLE 1

Contact definition of an integrated circuit card according to ISO7816-2

| Contact | Designation | Use |
| --- | --- | --- |
| C1 | Vcc | Power connection through which operating power is supplied to the microprocessor chip in the card |
| C2 | RST | Reset line through which the IFD can signal to the smart card's microprocessor chip to initiate its reset sequence of instructions |
| C3 | CLK | Clock signal line through which a clock signal can be provided to the microprocessor chip. This line controls the operation speed and provides a common framework for data communication between the IFD and the ICC |
| C4 | RFU | Reserved for future use |
| C5 | GND | Ground line providing common electrical ground between the IFD and the ICC |
| C6 | Vpp | Programming power connection used to program EEPROM of first generation ICCs |
| C7 | I/O | Input/output line that provides a half-duplex communication channel between the reader and the smart card |
| C8 | RFU | Reserved for future use |

Please refer to FIG. 3. FIG. 3 is a block diagram of an integrated circuit chip 21 of the integrated circuit card 20 according to the present invention. The integrated circuit chip 21 includes a Central Processing Unit (CPU) 32, a Read Only Memory (ROM) 31, a Random Access Memory (RAM) 33, a Flash memory 35, an Electrically Erasable Programmable Read Only Memory (EEPROM) 34 and a serial input/output As mentioned above, contacts C4 and C8 on the integrated circuit chip 21 are unused, and therefore, connection between the slave card 12 and the master card 11 can be electronically connected via either contact C4 or contact C8.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

The invention claimed is:

1. A dual card system for use in a communication terminal having two card sockets, comprising:
   a slave card; and
   a master card provided with a network security function, connected between said communication terminal and said slave card, having a processor for controlling said slave card,
   wherein said master card is controlled by said communication terminal and said slave card is controlled by said master card, such that said slave card can not be directly controlled by said communication terminal, and wherein said slave card and said master card can be inserted into said two card sockets, respectively.

2. The dual card system according to claim 1, wherein said network security function comprises network access control, mail encryption, or electronic signature.

3. The dual card system according to claim 1, wherein said slave card comprises an extensible memory for increasing storage capacity.

4. The dual card system according to claim 1, wherein said slave card comprises a security function.

5. The dual card system according to claim 4, wherein said security function comprises a network security function, data security function, or data encryption.

6. The dual card system according to claim 1, wherein said communication terminal is a mobile phone or a personal digital assistant (PDA).

7. The dual card system according to claim 1, wherein either of said slave card and said master card comprises a Subscriber Identity Module (SIM) card, universal SIM (USIM) card, User Identity Module (UIM) card, or Removable User Identity Module (RUIM) card.

8. The dual card system according to claim 1, wherein either of said slave card and said master card comprises a WAP identity module (WIM).

9. The dual card system according to claim 1, wherein either of said slave card and master card comprises a credit card, ATM card, easy card, debit card, or stored value card.

10. The dual card system according to claim 1, wherein either of said slave card and master card comprises an identification card, a memory card, a health insurance card, or a membership card.

11. The dual card system according to claim 1, further comprising an antenna detachably coupled to said slave card.

12. The dual card system according to claim 11, wherein said antenna comprises a laminated induction coil antenna or a planar antenna.

13. The dual card system according to claim 1, further comprising an antenna detachably coupled to said master card.

14. The dual card system according to claim 13, wherein said antenna comprises a laminated induction coil antenna or a planar antenna.

15. The dual card system according to claim 1, wherein said system can be applied to an automatic teller machine (ATM) or a point of sales (POS) card reader.

16. A communication terminal having two card sockets and a dual card system which comprises:
   a slave card; and
   a master card provided with a network security function, connected between said communication terminal and said slave card, having a processor for controlling said slave card,
   wherein said master card is controlled by said communication terminal and said slave card is controlled by said master card, such that said slave card can not be directly controlled by said communication terminal, and wherein said slave card and said master card can be inserted into said two card sockets, respectively.

17. The communication terminal according to claim 16, wherein said network security function comprises network access control, mail encryption, or electronic signature.

18. The communication terminal according to claim 16, wherein said slave card comprises an extensible memory for increasing storage capacity.

19. The communication terminal according to claim 16, wherein said slave card comprises a security function.

20. The communication terminal according to claim 19, wherein said security function comprises a network security function, data security function, or data encryption.

21. The communication terminal according to claim 16, wherein said communication terminal is a mobile phone or a personal digital assistant (PDA).

22. The communication terminal according to claim 16, wherein either of said slave card and master card comprises a Subscriber Identity Module (SIM) card, universal SIM (USIM) card, User Identity Module (UIM) card, or Removable User Identity Module (RUIM) card.

23. The communication terminal according to claim 16, wherein either of said slave card and said master card comprises a WAP identity module (WIM).

24. The communication terminal according to claim 16, wherein either of said slave card and master card comprises a credit card, ATM card, easy card, debit card, or stored value card.

25. The communication terminal according to claim 16, wherein either of said slave card and master card comprises an identification card, a memory card, a health insurance card, or a membership card.

26. The communication terminal according to claim 16, further comprising an antenna detachably coupled to said slave card.

27. The communication terminal according to claim 26, wherein said antenna comprises a laminated induction coil antenna or a planar antenna.

28. The communication terminal according to claim 16, further comprising an antenna detachably coupled to said master card.

29. The communication terminal according to claim 28, wherein said antenna comprises a laminated induction coil antenna or a planar antenna.

30. The communication terminal according to claim 16, wherein said system can be applied to an automatic teller machine (ATM) or a point of sales (POS) card reader.

* * * * *